(12) United States Patent
Seo et al.

(10) Patent No.: US 8,414,444 B2
(45) Date of Patent: Apr. 9, 2013

(54) PLANETARY GEAR TRAIN OF AUTOMATIC TRANSMISSION FOR VEHICLES

(75) Inventors: Kangsoo Seo, Suwon-si (KR); Hyu Tae Shim, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/307,960

(22) Filed: Nov. 30, 2011

(65) Prior Publication Data

US 2012/0277052 A1 Nov. 1, 2012

(30) Foreign Application Priority Data

Apr. 26, 2011 (KR) .................. 10-2011-0038971

(51) Int. Cl.
*F16H 3/62* (2006.01)

(52) U.S. Cl. ...................... 475/275; 475/285

(58) Field of Classification Search .................. 475/275, 475/284, 285, 297
See application file for complete search history.

(56) References Cited

U.S. PATENT DOCUMENTS

| 7,678,009 | B2 | 3/2010 | Phillips et al. | |
|---|---|---|---|---|
| 2008/0039266 | A1* | 2/2008 | Shim | 475/280 |
| 2008/0207380 | A1* | 8/2008 | Raghavan et al. | 475/275 |

FOREIGN PATENT DOCUMENTS

| JP | 2007-78021 A | 3/2007 |
|---|---|---|
| JP | 2009-138829 A | 6/2009 |
| JP | 2009-144905 A | 7/2009 |
| JP | 2010-230029 A | 10/2010 |
| JP | 2011-117567 A | 6/2011 |
| KR | 10-2010-0004415 A | 1/2010 |

\* cited by examiner

*Primary Examiner* — Edwin A Young
(74) *Attorney, Agent, or Firm* — Morgan, Lewis & Bockius LLP

(57) ABSTRACT

A planetary gear train of an automatic transmission for vehicles may include an input shaft adapted to receive torque of an engine, an output gear adapted to output changed torque, a first planetary gear set having a first sun gear, a first planet carrier, and a first ring gear as rotation elements, a second planetary gear set having a second sun gear, a second planet carrier, and a second ring gear as rotation elements, a third planetary gear set having a third sun gear, a third planet carrier, and a third ring gear as rotation elements, seven rotation shafts connected or selectively connected to one or more rotation elements, other rotation shafts, or a transmission housing, and six friction members interposed selectively at connecting portions of the rotation shafts.

6 Claims, 3 Drawing Sheets

FIG. 2

| Shift-Speed | C1 | C2 | C3 | C4 | B1 | B2 | SPEED RATIO |
|---|---|---|---|---|---|---|---|
| D1 | ● |   |   | ● | ● |   | 4.551 |
| D2 | ● |   |   |   | ● | ● | 3.909 |
| D3 | ● |   |   | ● |   | ● | 2.268 |
| D4 | ● | ● |   |   |   | ● | 1.357 |
| D5 | ● |   | ● |   |   | ● | 1.101 |
| D6 | ● | ● | ● |   |   |   | 1.000 |
| D7 |   | ● | ● |   |   | ● | 0.872 |
| D8 |   |   | ● | ● |   | ● | 0.643 |
| REV1 |   | ● |   |   | ● | ● | -2.443 |
| REV2 |   | ● |   | ● | ● |   | -1.800 |

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2011-0038971 filed in the Korean Intellectual Property Office on Apr. 26, 2011, the entire contents of which application are incorporated herein for all purposes by this reference.

BACKGROUND OF INVENTION

1. Field of Invention

The present invention relates to an automatic transmission for vehicles. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For this reason, the planetary gear train that is able to realize more shift speeds is under continuous investigation.

Though achieving the same number of speeds, the planetary gear train can have different operating mechanisms due to different connections among rotation elements (i.e., sun gear, planet carrier, and ring gear).

In addition, the planetary gear train has different features such as durability, power delivery efficiency, and size depending on the layout thereof. Therefore, designs for a combining structure of a gear train are also under continuous investigation.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and ten-speed automatic transmissions have been developed at a good pace.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a planetary gear train of an automatic transmission for vehicles having advantages of achieving eight forward speeds and two reverse speeds by combining a plurality of planetary gear sets with a plurality of friction members and reducing drag loss by reducing the number of friction members which are not operated at each shift-speed.

Exemplary planetary gear trains of an automatic transmission for vehicles according to the present invention may include: an input shaft adapted to receive a torque of an engine; an output gear adapted to output a changed torque; a first planetary gear set having a first sun gear, a first planet carrier, and a first ring gear as rotation elements thereof; a second planetary gear set having a second sun gear, a second planet carrier, and a second ring gear as rotation elements thereof; a third planetary gear set having a third sun gear, a third planet carrier, and a third ring gear as rotation elements thereof; a first rotation shaft connected to the first sun gear and selectively connected to a transmission housing; a second rotation shaft connected to the first planet carrier; a third rotation shaft connected to the first ring gear and directly connected to the input shaft; a fourth rotation shaft connected to the second sun gear and selectively connected to the second rotation shaft; a fifth rotation shaft connected to the third ring gear and directly connected to the output gear; a sixth rotation shaft directly connected to the second planet carrier and the third planet carrier and selectively connected to the input shaft; a seventh rotation shaft directly connected to the second ring gear and the third sun gear and selectively connected to the first rotation shaft or the second rotation shaft; and six friction members interposed selectively at connecting portions of the rotation shafts.

The first, second, and third planetary gear sets may be single pinion planetary gear sets.

The six friction members may include: a first clutch selectively connecting the second rotation shaft to the fourth rotation shaft; a second clutch selectively connecting the second rotation shaft to the seventh rotation shaft; a third clutch selectively connecting the sixth rotation shaft to the input shaft; a fourth clutch selectively connecting the first rotation shaft to the seventh rotation shaft; a first brake selectively connecting the sixth rotation shaft to the transmission housing; and a second brake selectively connecting the first rotation shaft to the transmission housing.

Forward speeds achieved by operating three friction members among the six friction members may include: a first forward speed achieved by operating the first clutch, the fourth clutch, and the first brake; a second forward speed achieved by operating the first clutch, the first brake, and the second brake; a third forward speed achieved by operating the first clutch, the fourth clutch, and the second brake; a fourth forward speed achieved by operating the first clutch, the second clutch, and the second brake; a fifth forward speed achieved by operating the first clutch, the third clutch, and the second brake; a sixth forward speed achieved by operating the first clutch, the second clutch, and the third clutch; a seventh forward speed achieved by operating the second clutch, the third clutch, and the second brake; and an eighth forward speed achieved by operating the third clutch, the fourth clutch, and the second brake.

Reverse speeds achieved by operating three friction members among the six friction members may include: a first reverse speed achieved by operating the second clutch, the first brake, and the second brake; and a second reverse speed achieved by operating the second clutch, the fourth clutch, and the first brake.

The planetary gear train may further include a one-way clutch disposed in parallel with the first brake, and operated at a normal driving condition.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to an exemplary planetary gear train according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 1:
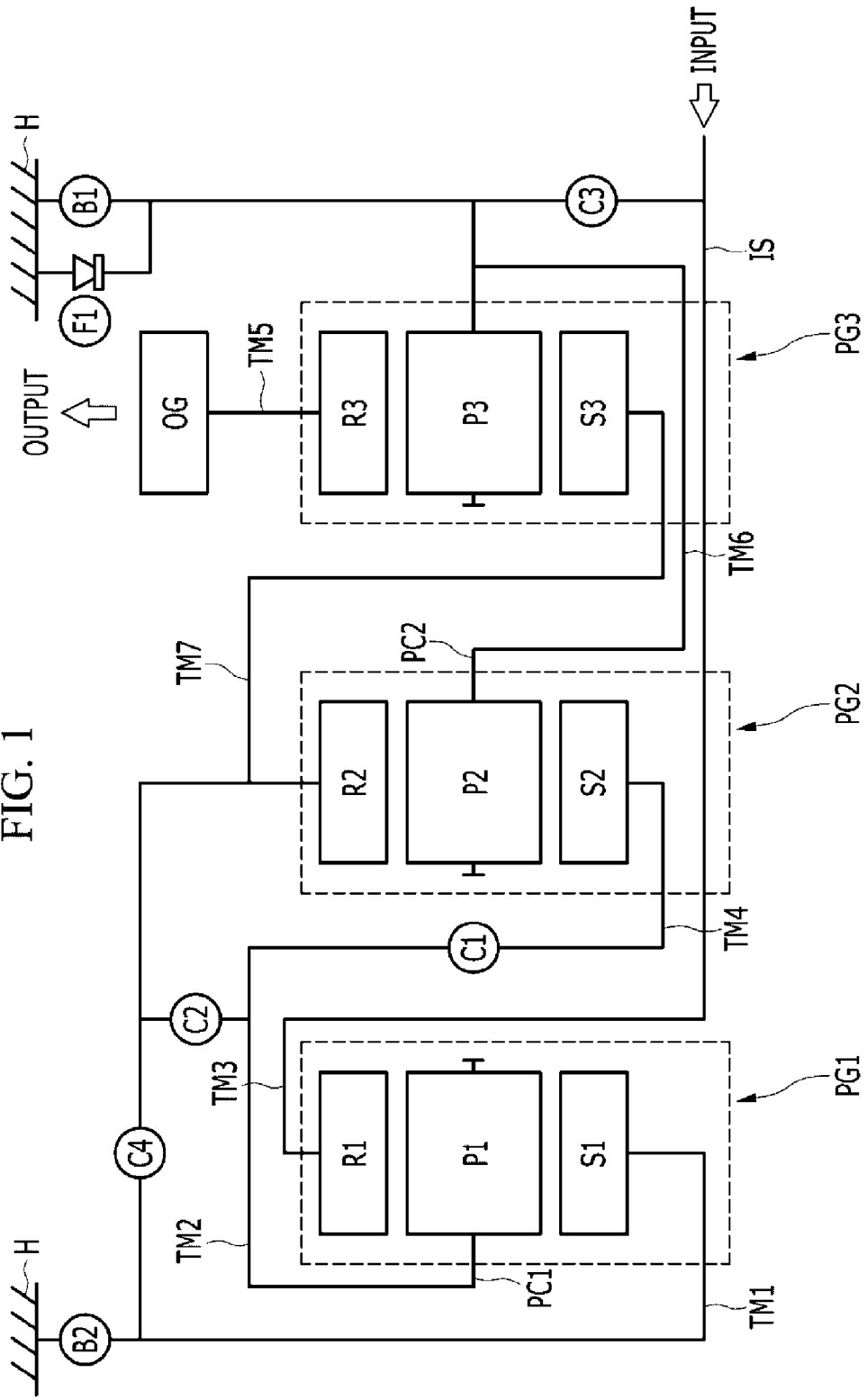
FIG. 1 is a schematic diagram of an exemplary planetary gear train according to the present invention.

Description of components that are not necessary for explaining the present exemplary embodiment will be omitted, and the same constituent elements are denoted by the same reference numerals in this specification In the detailed description, ordinal numbers are used for distinguishing constituent elements having the same terms, and have no specific meanings or orders Referring to FIG. 1, a planetary gear train according to various embodiments of the present invention includes first, second, and third planetary gear sets PG1, PG2, and PG3 disposed on the same axis, an input shaft IS, an output gear OG, seven rotation shafts TM1, TM2, TM3, TM4, TM5, TM6, and TM7 directly or selectively connecting rotation elements of first, second, and third planetary gear sets PG1, PG2, and PG3, six friction members (first, second, third, and fourth clutches C1, C2, C3, and C4 and first and second brakes B1 and B2), and a transmission housing H.

A torque input from the input shaft IS is changed by the first, second, and third planetary gear sets PG1, PG2, and PG3 and is output through the output gear OG.

In addition, the planetary gear sets is disposed in a sequence of the third, second, and first planetary gear sets PG3, PG2, and PG1 from an engine.

The input shaft IS is an input member, and torque from a crankshaft of the engine is changed through a torque converter and is input to the input shaft IS.

The output gear OG is an output member and delivers driving torque so as to run driving wheels through a differential apparatus.

The first planetary gear set PG1 is a single pinion planetary gear set, and has a first sun gear S1, a first planet carrier PC1 supporting a first pinion P1 externally engaged to the first sun gear S1, and a first ring gear R1 internally engaged to the first pinion P1 as rotation elements thereof.

The second planetary gear set PG2 is a single pinion planetary gear set, and has a second sun gear S2, a second planet carrier PC2 supporting a second pinion P2 externally engaged to the second sun gear S2, and a second ring gear R2 internally engaged to the second pinion P2 as rotation elements thereof.

The third planetary gear set PG3 is a single pinion planetary gear set, and has a third sun gear S3, a third planet carrier PC3 supporting a third pinion P3 externally engaged to the third sun gear S3, and a third ring gear R3 internally engaged to the third pinion P3 as rotation elements thereof.

In addition, three rotation elements of the first planetary gear set PG1 is operated as independent rotation elements, and the first planetary gear set PG1 includes first, second, and third rotation shafts TM1, TM2, and TM3.

In the second and third planetary gear sets PG2 and PG3, the second and third planet carriers PC2 and PC3 are directly connected to each other, and the second ring gear R2 and the third sun gear S3 are directly connected to each other such that fourth, fifth, sixth, and seventh rotation shafts TM4, TM5, TM6, and TM7 are included.

The first rotation shaft TM1 includes the first sun gear S1. The second rotation shaft TM2 includes the first planet carrier PC1. The third rotation shaft TM3 includes the first ring gear R1 and is directly connected to the input shaft IS so as to be always operated as an input element. The fourth rotation shaft TM4 includes the second sun gear S2. The fifth rotation shaft TM5 includes the third ring gear R3 and is directly connected to the output gear OG so as to be always operated as a final output element. The sixth rotation shaft TM6 includes the second planet carrier PC2 and the third planet carrier PC3 directly connected to each other without a friction member. The seventh rotation shaft TM7 includes the second ring gear R2 and the third sun gear S3 directly connected to each other without a friction member.

The first clutch C1 selectively connects the second rotation shaft TM2 to the fourth rotation shaft TM4. The second clutch C2 selectively connects the second rotation shaft TM2 to the seventh rotation shaft TM7. The third clutch C3 selectively connects the input shaft IS to the sixth rotation shaft TM6. The fourth clutch C4 selectively connects the first rotation shaft TM1 to the seventh rotation shaft TM7.

The first brake B1 selectively connects the sixth rotation shaft TM6 to the transmission housing H. The second brake B2 selectively connects the first rotation shaft TM1 to the transmission housing H.

The first brake B1 includes a one-way clutch F1 disposed in parallel thereto, and the one-way clutch F1 is operated at a normal driving condition instead of the first brake B1 being operated.

A clutch is a friction member selectively connecting one rotation member to another rotation member, and a brake is a friction member connecting a rotation member to a non-rotation member.

If the clutch is operated, rotation shafts connected to each other is operated as one rotation member, and if the brake is operated, a rotation shaft connected to the transmission housing H is operated as a non-rotation member.

In addition, the friction members comprising of the first, second, third, and fourth clutches C1, C2, C3, and C4 and the first and second brakes B1 and B2 may be conventional multiplate friction elements of wet type that are operated by hydraulic pressure. However, one will appreciate that other types of friction members can be used.

FIG. 2 is an operational chart of friction members at each shift-speed applied to a planetary gear train according to various embodiments of the present invention. It shows that three friction members among six friction members are operated at each shift-speed; and eight forward speeds and two reverse speeds are achieved.

Referring to FIG. 2, operations of the friction members at each shift-speed are as follows.

At a first forward speed D1, the first clutch C1, the fourth clutch C4, and the first brake B1 are operated. At a second forward speed D2, the first clutch C1, the first brake B1, and the second brake B2 are operated. At a third forward speed D3, the first clutch C1, the fourth clutch C4, and the second brake B2 are operated. At a fourth forward speed D4, the first clutch C1, the second clutch C2, and the second brake B2 are operated. At a fifth forward speed D5, the first clutch C1, the third clutch C3, and the second brake B2 are operated. At a sixth forward speed D6, the first clutch C1, the second clutch C2, and the third clutch C3 are operated. At a seventh forward speed D7, the second clutch C2, the third clutch C3, and the second brake B2 are operated. At an eighth forward speed D8, the third clutch C3, the fourth clutch C4, and the second brake B2 are operated.

At a first reverse speed REV1, the second clutch C2, the first brake B1, and the second brake B2 are operated. At a second reverse speed REV2, the second clutch C2, the fourth clutch C4, and the first brake B1 are operated.

It is explained that the first clutch C1, the fourth clutch C4, and the first brake B1 are operated at the first forward speed D1, but the one-way clutch F1 instead of the first brake B1 is operated at the normal driving condition.

Figure 3:
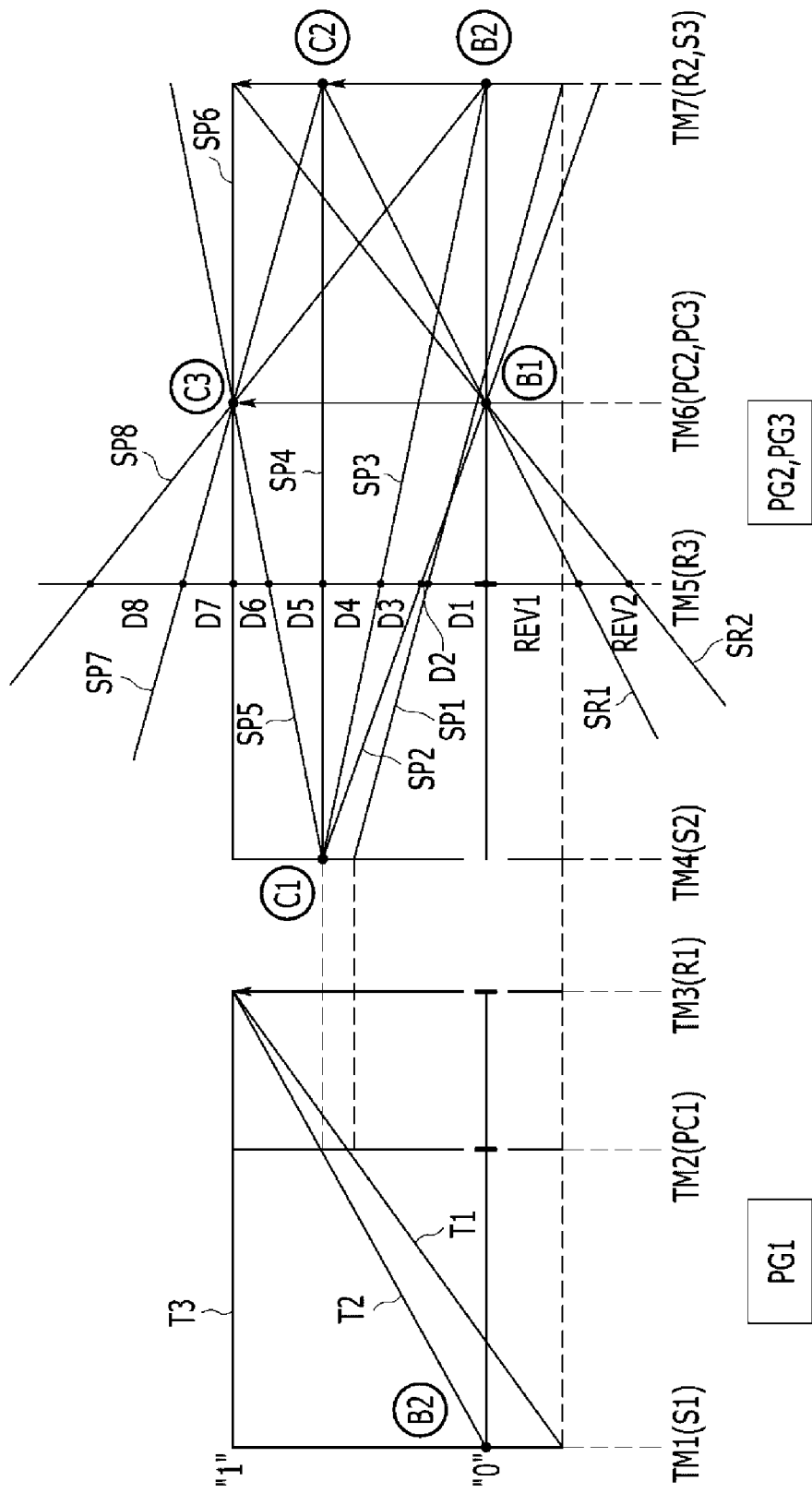
FIG. 3 is a lever diagram for an exemplary planetary gear train according to the present invention.

FIG. 3 is a lever diagram for a planetary gear train according to various embodiments of the present invention.

Referring to FIG. 3, a lower horizontal line represents a rotation speed of "0", and an upper horizontal line represents a rotation speed of "1.0", that is, the rotation speed thereof is the same as that of the input shaft IS.

Three vertical lines of the first planetary gear set PG1 sequentially represent the first, second, and third rotation shafts TM1, TM2, and TM3 from the left to the right.

Herein, distances between the first, second, and third rotation shafts TM1, TM2, and TM3 are set according to gear ratios (teeth number of the sun gear/teeth number of the ring gear) of the first planetary gear set PG1.

Four vertical lines of the second and third planetary gear sets PG2 and PG3 sequentially represent the fourth, fifth, sixth, and seventh rotation shafts TM4, TM5, TM6, and TM7 from the left to the right.

Herein, distances between the fourth, fifth, sixth, and seventh rotation shafts TM4, TM5, TM6, and TM7 are set according to gear ratios (teeth number of the sun gear/teeth number of the ring gear) of the second and third planetary gear sets PG2 and PG3.

Referring to FIG. 2 and FIG. 3, shifting processes for each shift-speed in the planetary gear train according to various embodiments will be described.

First Forward Speed

Referring to FIG. 2, the first clutch C1, the fourth clutch C4, and the first brake B1 are simultaneously operated at the first forward speed D1.

As shown in FIG. 3, in a state that the rotation speed of the input shaft IS is input to the third rotation shaft TM3, the sixth rotation shaft TM6 is operated as the fixed element by operation of the first brake B1.

In addition, the first rotation shaft TM1 is connected to the seventh rotation shaft TM7 by operation of the fourth clutch C4. Thus, the first planetary gear set PG1 forms a first speed line T1 and a first reduced speed is output through the second rotation shaft TM2.

In a state that the rotation speed of the second rotation shaft TM2 is input to the second and third planetary gear sets PG2 and PG3 through the fourth rotation shaft TM4, the sixth rotation shaft TM6 is operated as the fixed element by operation of the first brake B1 so as to form a first shift line SP1.

Therefore, the first shift line SP1 crosses the vertical line of the fifth rotation shaft TM5 that is the output element such that the first forward speed D1 is output.

Second Forward Speed

The fourth clutch C4 that was operated at the first forward speed D1 is released and the second brake B2 is operated at the second forward speed D2.

As shown in FIG. 3, in a state that the rotation speed of the input shaft IS is input to the third rotation shaft TM3, the first rotation shaft TM1 is operated as the fixed element by operation of the second brake B2.

Thus, the first planetary gear set PG1 forms a second speed line T2, and a second reduced speed is output through the second rotation shaft TM2.

In a state that the rotation speed of the second rotation shaft TM2 is input to the second and third planetary gear sets PG2 and PG3 through the fourth rotation shaft TM4 by operation of the first clutch C1, the sixth rotation shaft TM6 is operated as the fixed element by operation of the first brake B1 so as to form a second shift line SP2.

Therefore, the second shift line SP2 crosses the vertical line of the fifth rotation shaft TM5 that is the output element such that the second forward speed D2 is output.

Third Forward Speed

The first brake B1 that was operated at the second forward speed D2 is released and the fourth clutch C4 is operated at the third forward speed D3.

As shown in FIG. 3, in a state that the rotation speed of the input shaft IS is input to the third rotation shaft TM3, the first rotation shaft TM1 is operated as the fixed element by operation of the second brake B2.

Thus, the first planetary gear set PG1 forms a second speed line T2, and a second reduced speed is output through the second rotation shaft TM2.

The rotation speed of the second rotation shaft TM2 is input to the second and third planetary gear sets PG2 and PG3 through the fourth rotation shaft TM4 by operation of the first clutch C1.

At this state, the seventh rotation shaft TM7 is connected to the first rotation shaft TM1 by operation of the fourth clutch C4. Therefore, the seventh rotation shaft TM7 is operated as the fixed element and a third shift line SP3 is formed.

Therefore, the third shift line SP3 crosses the vertical line of the fifth rotation shaft TM5 that is the output element such that the third forward speed D3 is output.

Fourth Forward Speed

The fourth clutch C4 that was operated at the third forward speed D3 is released and the second clutch C2 is operated at the fourth forward speed D4.

As shown in FIG. 3, in a state that the rotation speed of the input shaft IS is input to the third rotation shaft TM3, the first rotation shaft TM1 is operated as the fixed element by operation of the second brake B2.

Thus, the first planetary gear set PG1 forms a second speed line T2, and a second reduced speed is output through the second rotation shaft TM2.

The rotation speed of the second rotation shaft TM2 is simultaneously input to the fourth rotation shaft TM4 and the seventh rotation shaft TM7 by operations of the first clutch C1 and the second clutch C2 in the second and third planetary gear sets PG2 and PG3.

Therefore, the second and third planetary gear sets PG2 and PG3 become direct-coupling state and a fourth shift line SP4 is formed. Therefore, the fourth shift line SP4 crosses the vertical line of the fifth rotation shaft TM5 that is the output element such that the fourth forward speed D4 is output.

Fifth Forward Speed

The second clutch C2 that was operated at the fourth forward speed D4 is released and the third clutch C3 is operated at the fifth forward speed D5.

As shown in FIG. 3, in a state that the rotation speed of the input shaft IS is input to the third rotation shaft TM3, the first rotation shaft TM1 is operated as the fixed element by operation of the second brake B2.

Thus, the first planetary gear set PG1 forms a second speed line T2, and a second reduced speed is output through the second rotation shaft TM2.

The rotation speed of the second rotation shaft TM2 is input to the second and third planetary gear sets PG2 and PG3 through the fourth rotation shaft TM4 by operation of the first clutch C1.

At this state, the rotation speed of the input shaft IS is input to the sixth rotation shaft TM6 by operation of the third clutch C3, and a fifth shift line SP5 is formed.

Therefore, the fifth shift line SP5 crosses the vertical line of the fifth rotation shaft TM5 that is the output element such that the fifth forward speed D5 is output.

Sixth Forward Speed

The second brake B2 that was operated at the fifth forward speed D5 is released and the second clutch C2 is operated at the sixth forward speed D6.

Since the first, second, and third clutches C1, C2, and C3 are operated, the first, second, and third planetary gear sets PG1, PG2, and PG3 become direct-coupling state.

Therefore, a third speed line T3 and a sixth shift line SP6 are formed and the sixth forward speed D6 that is the same as the rotation speed of the input shaft IS is output.

Seventh Forward Speed

The first clutch C1 that was operated at the sixth forward speed D6 is released and the second brake B2 is operated at the seventh forward speed D7.

As shown in FIG. 3, in a state that the rotation speed of the input shaft IS is input to the third rotation shaft TM3, the first rotation shaft TM1 is operated as the fixed element by operation of the second brake B2.

Thus, the first planetary gear set PG1 forms a second speed line T2, and a second reduced speed is output through the second rotation shaft TM2.

The rotation speed of the second rotation shaft TM2 is input to the second and third planetary gear sets PG2 and PG3 through the seventh rotation shaft TM7 by operation of the second clutch C2.

At this state, the rotation speed of the input shaft IS is input to the sixth rotation shaft TM6 by operation of the third clutch C3 and a seventh shift line SP7 is formed.

Therefore, the seventh shift line SP7 crosses the vertical line of the fifth rotation shaft TM5 that is the output element such that the seventh forward speed D7 is output.

Eighth Forward Speed

The second clutch C2 that was operated at the seventh forward speed D7 is released and the fourth clutch C4 is operated at the eighth forward speed D8.

As shown in FIG. 3, in a state that the rotation speed of the input shaft IS is input to the third rotation shaft TM3, the first rotation shaft TM1 is operated as the fixed element by operation of the second brake B2.

Thus, the first planetary gear set PG1 forms a second speed line T2, and a second reduced speed is output through the second rotation shaft TM2.

However, since the first and second clutches C1 and C2 are not operated, the rotation speed of the second rotation shaft TM2 is not delivered to the second and third planetary gear sets PG2 and PG3.

In a state that the seventh rotation shaft TM7 is operated as the fixed element by operations of the fourth clutch C4 and the second brake B2, the rotation speed of the input shaft IS is input to the sixth rotation shaft TM6 by operation of the third clutch C3 in the second and third planetary gear sets PG2 and PG3.

Therefore, an eighth shift line SP8 is formed, and the eighth shift line SP8 crosses the vertical line of the fifth rotation shaft TM5 that is the output element such that the eighth forward speed D8 is output.

First Reverse Speed

The second clutch C2, the first brake B1, and the second brake B2 are operated at the first reverse speed REV1.

As shown in FIG. 3, in a state that the rotation speed of the input shaft IS is input to the third rotation shaft TM3, the first rotation shaft TM1 is operated as the fixed element by operation of the second brake B2.

Thus, the first planetary gear set PG1 forms a second speed line T2, and a second reduced speed is output through the second rotation shaft TM2.

The rotation speed of the second rotation shaft TM2 is input to the second and third planetary gear sets PG2 and PG3 through the seventh rotation shaft TM7 by operation of the second clutch C2.

At this state, the sixth rotation shaft TM6 is operated as the fixed element by operation of the first brake B1, and a first reverse shift line SR1 is formed.

Therefore, the first reverse shift line SR1 crosses the vertical line of the fifth rotation shaft TM5 that is the output element such that the first reverse speed REV1 is output.

Second Reverse Speed

The second brake B2 that was operated at the first reverse speed REV1 is released and the fourth clutch C4 is operated at the second reverse speed REV2.

As shown in FIG. 3, in a state that the rotation speed of the input shaft IS is input to the third rotation shaft TM3, the second and fourth clutches C2 and C4 are operated. Therefore, the first planetary gear set PG1 becomes direct-coupling state. Therefore, the rotation speed of the input shaft IS is delivered to the second and third planetary gear sets PG2 and PG3 through the seventh rotation shaft TM7.

In a state that the rotation speed of the input shaft IS is input to the seventh rotation shaft TM7, the sixth rotation shaft TM6 is operated as the fixed element by operation of the first brake B1. Accordingly, the second and third planetary gear sets PG2 and PG3 form a second reverse shift line SR2.

Therefore, the second reverse shift line SR2 crosses the vertical line of the fifth rotation shaft TM5 that is the output element such that the second reverse speed REV2 is output.

As described above, eight forward speeds and two reverse speeds are achieved by combining three planetary gear sets PG1, PG2, and PG3 with four clutches C1, C2, C3, and C4 and two brakes B1 and B2 according to various embodiments of the present invention.

Therefore, power delivery efficiency and fuel economy may be improved and reverse speed performance may be also improved.

Since at least three friction members are operated at each shift-speed, the number of the friction members that are not operated can be reduced. Therefore, drag loss may be reduced and power delivery efficiency and fuel economy may be further improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
    an input shaft adapted to receive a torque of an engine;
    an output gear adapted to output a changed torque;
    a first planetary gear set having a first sun gear, a first planet carrier, and a first ring gear as rotation elements thereof;
    a second planetary gear set having a second sun gear, a second planet carrier, and a second ring gear as rotation elements thereof;
    a third planetary gear set having a third sun gear, a third planet carrier, and a third ring gear as rotation elements thereof;
    a first rotation shaft connected to the first sun gear and selectively connected to a transmission housing;
    a second rotation shaft connected to the first planet carrier;
    a third rotation shaft connected to the first ring gear and directly connected to the input shaft;
    a fourth rotation shaft connected to the second sun gear and selectively connected to the second rotation shaft;
    a fifth rotation shaft connected to the third ring gear and directly connected to the output gear;
    a sixth rotation shaft directly connected to the second planet carrier and the third planet carrier and selectively connected to the input shaft;
    a seventh rotation shaft directly connected to the second ring gear and the third sun gear and selectively connected to the first rotation shaft or the second rotation shaft; and
    six friction members interposed selectively at connecting portions of the rotation shafts.

2. The planetary gear train of claim 1, wherein the first, second, and third planetary gear sets are single pinion planetary gear sets.

3. The planetary gear train of claim 1, wherein the six friction members comprises:
    a first clutch selectively connecting the second rotation shaft to the fourth rotation shaft;
    a second clutch selectively connecting the second rotation shaft to the seventh rotation shaft;
    a third clutch selectively connecting the sixth rotation shaft to the input shaft;
    a fourth clutch selectively connecting the first rotation shaft to the seventh rotation shaft;
    a first brake selectively connecting the sixth rotation shaft to the transmission housing; and
    a second brake selectively connecting the first rotation shaft to the transmission housing.

4. The planetary gear train of claim 3, wherein forward speeds achieved by operating three friction members among the six friction members comprise:
    a first forward speed achieved by operating the first clutch, the fourth clutch, and the first brake;
    a second forward speed achieved by operating the first clutch, the first brake, and the second brake;
    a third forward speed achieved by operating the first clutch, the fourth clutch, and the second brake;
    a fourth forward speed achieved by operating the first clutch, the second clutch, and the second brake;
    a fifth forward speed achieved by operating the first clutch, the third clutch, and the second brake;
    a sixth forward speed achieved by operating the first clutch, the second clutch, and the third clutch;
    a seventh forward speed achieved by operating the second clutch, the third clutch, and the second brake; and
    an eighth forward speed achieved by operating the third clutch, the fourth clutch, and the second brake.

5. The planetary gear train of claim 3, wherein reverse speeds achieved by operating three friction members among the six friction members comprise:
    a first reverse speed achieved by operating the second clutch, the first brake, and the second brake; and
    a second reverse speed achieved by operating the second clutch, the fourth clutch, and the first brake.

6. The planetary gear train of claim 3, further comprising a one-way clutch disposed in parallel with the first brake, and operated at a normal driving condition.

* * * * *